United States Patent
Flender et al.

(10) Patent No.: US 8,720,055 B2
(45) Date of Patent: May 13, 2014

(54) METHOD OF ASSEMBLING A CAM SHAFT THAT INCLUDES A THERMAL INTERFERENCE FIT BETWEEN THE CAM SHAFT AND A BEARING

(75) Inventors: Thomas Flender, Eberdingen (DE); Michael Kreisig, Stuttgart (DE); Falk Schneider, Korntal-Münchingen (DE)

(73) Assignee: Mahle International GmbH (DE)

( * ) Notice: Subject to any disclaimer, the term of this patent is extended or adjusted under 35 U.S.C. 154(b) by 66 days.

(21) Appl. No.: 13/494,740

(22) Filed: Jun. 12, 2012

(65) Prior Publication Data

US 2012/0255170 A1 Oct. 11, 2012

Related U.S. Application Data

(62) Division of application No. 12/124,533, filed on May 21, 2008, now abandoned.

(30) Foreign Application Priority Data

May 22, 2007 (DE) .......................... 10 2007 024 092

(51) Int. Cl.
*B21D 53/84* (2006.01)
*B21D 53/10* (2006.01)
*B21K 1/06* (2006.01)
*B23P 11/02* (2006.01)
*B21K 1/76* (2006.01)

(52) U.S. Cl.
USPC ........... 29/888.1; 29/898.07; 29/447; 74/567; 123/90.6; 123/90.17

(58) Field of Classification Search
CPC .......... B21D 53/84; B21D 53/10; B21K 1/76; B23P 17/00
USPC ........ 29/888.1, 898.07, 447; 74/567, 838, 53, 74/55; 123/90.6, 90.17; 384/609, 541, 384/542, 906
See application file for complete search history.

(56) References Cited

U.S. PATENT DOCUMENTS 2,584,740 A * 2/1952 Reynolds ...................... 403/350
3,516,136 A * 6/1970 Edwin et al. ............... 29/898.07
(Continued)

FOREIGN PATENT DOCUMENTS

DE 2232438 1/1974
DE 3244258 A1 5/1984
(Continued)

OTHER PUBLICATIONS

English Abstract for DE 19807675.
(Continued)

*Primary Examiner* — David Bryant
*Assistant Examiner* — Jason L Vaughan
(74) *Attorney, Agent, or Firm* — Rader, Fishman & Grauer PLLC

(57) ABSTRACT

The instant invention relates to a cam shaft for internal combustion engines of motor vehicles, which is supported on a cylinder head housing via at least one roller bearing, wherein provision is made for at least one thrust bearing, which supports the cam shaft in axial direction and which is embodied as ball or also as roller bearing.

19 Claims, 5 Drawing Sheets

(56) References Cited

U.S. PATENT DOCUMENTS

| | | | | |
|---|---|---|---|---|
| 3,999,277 | A * | 12/1976 | Hamada | 29/447 |
| 4,509,871 | A | 4/1985 | Herzog et al. | |
| 4,616,389 | A * | 10/1986 | Slee | 419/8 |
| 4,660,269 | A * | 4/1987 | Suzuki | 29/523 |
| 4,664,706 | A * | 5/1987 | Drozda | 75/246 |
| 4,696,266 | A | 9/1987 | Harada | |
| 4,738,012 | A * | 4/1988 | Hughes et al. | 29/888.1 |
| 4,763,503 | A * | 8/1988 | Hughes et al. | 72/57 |
| 5,065,507 | A * | 11/1991 | Wakamori et al. | 29/888.1 |
| 5,101,554 | A * | 4/1992 | Breuer et al. | 29/888.1 |
| 5,187,866 | A * | 2/1993 | Rhoades | 29/888.1 |
| 5,330,284 | A * | 7/1994 | Persson | 403/370 |
| 5,664,463 | A * | 9/1997 | Amborn et al. | 74/567 |
| 6,286,196 | B1 * | 9/2001 | Vogel | 29/421.1 |
| 6,473,964 | B1 * | 11/2002 | Anderson et al. | 29/888.1 |
| 6,688,774 | B2 * | 2/2004 | Kullin et al. | 384/539 |
| 7,305,767 | B2 * | 12/2007 | Nisley et al. | 29/898.08 |
| 7,699,032 | B2 * | 4/2010 | Muller et al. | 123/90.6 |
| 7,707,983 | B2 * | 5/2010 | Ueno et al. | 123/90.6 |
| 7,775,186 | B2 * | 8/2010 | Sakurai et al. | 123/90.6 |
| 7,992,533 | B2 * | 8/2011 | Vogel et al. | 123/90.6 |
| 8,225,762 | B2 * | 7/2012 | Lancefield et al. | 123/90.17 |
| 8,381,615 | B2 * | 2/2013 | Vogel et al. | 74/567 |
| 8,499,448 | B2 * | 8/2013 | Binder et al. | 29/888.1 |
| 2004/0003791 | A1 | 1/2004 | Ghelfi et al. | |
| 2004/0187825 | A1 | 9/2004 | Kurokawa et al. | |
| 2006/0005385 | A1 * | 1/2006 | Quaas | 29/888.08 |
| 2006/0064872 | A1 * | 3/2006 | Shirai | 29/888.1 |

FOREIGN PATENT DOCUMENTS

| | | |
|---|---|---|
| DE | 3803682 | 8/1989 |
| DE | 4408572 | 10/1995 |
| DE | 19807675 A1 | 8/1999 |
| DE | 19844203 | 3/2000 |
| DE | 10024894 C1 | 7/2002 |
| DE | 202006014691 | 1/2007 |
| EP | 1380729 | 1/2004 |
| EP | 1460240 | 9/2004 |
| EP | 1878881 A1 | 1/2008 |
| JP | 08284617 | 10/1996 |
| JP | 2002349388 | 12/2002 |
| JP | 2004116297 | 4/2004 |
| JP | 2005307840 | 11/2005 |
| JP | 2006-226183 A | 8/2006 |
| JP | 2006-226184 A | 8/2006 |
| WO | WO-2006088149 | 8/2006 |
| WO | WO-2007016913 | 2/2007 |

OTHER PUBLICATIONS

English Abstract for DE 19844203.
English Abstract for DE 3803682.
English Abstract for WO 2006088149.
English Abstract for WO 2007016913.
English abstract for DE-4408572.
English abstract for JP-2005307840.
English abstract for JP-2002349388.
English abstract for JP-08284617.
English abstract for JP-2004116297.
English abstract for DE3244258.
English abstract for JP-2006226184.
English abstract for JP-2006226183.

* cited by examiner

METHOD OF ASSEMBLING A CAM SHAFT THAT INCLUDES A THERMAL INTERFERENCE FIT BETWEEN THE CAM SHAFT AND A BEARING

CROSS-REFERENCES TO RELATED APPLICATION

This application is a divisional application of U.S. patent application Ser. No. 12/124,533, filed May 21, 2008, Now Abandoned, which claims priority to German patent application 102007024092.0 filed on May 22, 2007, both of which are hereby incorporated by reference in their entirety.

TECHNICAL FIELD

The invention relates to a cam shaft for internal combustion engines of motor vehicles, which is supported on a cylinder head housing via at least one roller bearing.

BACKGROUND

Typically, cam shafts are supported in cam shaft bearings, which are normally manufactured as bushings made from materials, such as aluminum alloys, for example, or as half bearings made of materials on the basis of copper alloys. However, other types of bearings, such as a roller bearing, for example, are also known from the state of the art. A thrust bearing function for the cam shaft is normally taken over via a so-called washer disk, which is also known as "thrust plate". However, as compared to other bearing devices, such washer disks have a considerably shorter life expectancy so that they must typically be replaced on a rotational basis.

The invention deals with the problem of specifying an improved embodiment for a cam shaft, where in particular a thrust bearing is improved.

This problem is solved according to the invention by means of the object of independent claim 1. Advantageous embodiments are the object of the dependent claims.

SUMMARY

The invention is based on the general idea of embodying a thrust bearing for a cam shaft for internal combustion engines of motor vehicles as ball bearings or as roller bearings and to thus on the one hand considerably extend the life expectancy of the thrust bearing and to thus on the other hand improve the thrust bearing as a whole. At the same time, the cam shaft supported in axial direction in such a manner can be supported on a cylinder head via further bearing devices, which are embodied as roller bearings, whereby the entire bearing of the cam shaft can be improved as compared to bearings known from the state of the art.

In an advantageous development of the solution according to the invention, at least one thrust bearing, which is embodied as a roller bearing, encompasses a roller, which runs directly on the cam shaft, wherein a region of the cam shaft, which comes into contact with the roller, is hardened. Through this, a particularly effective bearing of the cam shaft can be attained, wherein a hardening of the region, which comes into contact with the roller, can be hardened via an inductive and thus highly pinpointed heating, for example, as well as via a subsequent rapid cooling. The hardening thereby increases the wear resistance of the cam shaft, whereby the life expectancy thereof can be extended.

As an alternative thereto, provision can be made in a further embodiment in the region of the thrust bearing, which is embodied as roller bearing, for a bushing, which is arranged directly on the cam shaft and on which the roller of the roller bearing rolls. Such a bushing can also be hardened, for example, and can thus encompass a considerably improved wear resistance as compared to an unhardened material. At the same time, such a bushing can be chosen in such a manner with reference to its material characteristics that particularly good bearing characteristics can be attained.

Advantageously, the cams and/or the roller bearing and/or the at least one thrust bearing are connected to the cam shaft by means of a thermal joining process, by means of an interference fit assembly or by means of adhesion, wherein only finished cams and/or roller bearings and/or thrust bearings are used for joining with the cam shaft. Due to the finished components, a machine finishing of the cams and of the cam shaft, respectively, is not necessary after connecting the afore-mentioned components to the cam shaft, whereby it can be prevented that swarf, for example, penetrates into the roller bearings and negatively impacts them during the future operation.

Advantageously, the at least one thrust bearing, which is embodied as a ball or roller bearing, is arranged between two cams of the cam shaft and is directly supported thereon. The thrust bearing is thus fixed between the two cams with reference to its axial direction, without requiring further fixing elements for this purpose, the production of which is extensive, for example. It is also possible for the at least one thrust bearing, which is embodied as a ball or roller bearing, to be indirectly supported on the two cams via two spacer elements, in particular via two spacer bushings. Such spacer bushings provide the large advantage that the thrust bearing must not necessarily be arranged in the region directly next to the cams, but that, depending on the axial length of the chosen bushing, it can be arranged in a location, which is advantageous for the installation of the thrust bearing. In the alternative, these spacer bushings can also be fixedly connected to the adjacent cams, which entails a shortened assembly time for the cam shaft.

BRIEF DESCRIPTION OF THE DRAWING

Advantageous exemplary embodiments, which will be defined below, are illustrated in the drawings.

In each case in a schematic view.

DETAILED DESCRIPTION

Figure 1:
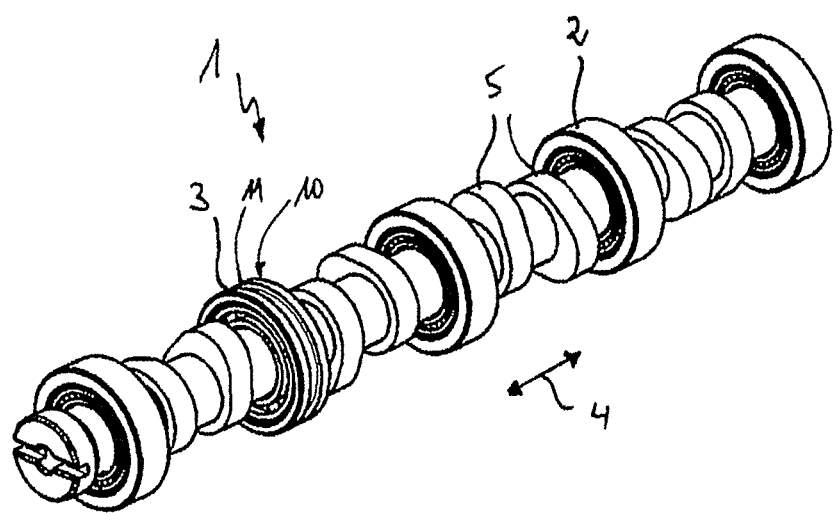
FIG. 1 shows a cam shaft according to the invention.

According to FIG. 1, a cam shaft 1 for internal combustion engines of motor vehicles according to the invention encompasses at least one roller bearing 2, via which the cam shaft 1 is supported on a non-illustrated cylinder head housing 15. Furthermore, the cam shaft 1 encompasses at least one thrust bearing 3, which supports the cam shaft 1 in axial direction 4 and which is embodied as a ball or as a roller bearing. The cam shaft 1 according to FIG. 1 is a cam shaft for engines comprising a so-called "tunnel bearing". That is to say, the cam shaft 1 is inserted into the cam shaft bearing of the crank case in the direction of the cam shaft axis 4.

Figure 2:
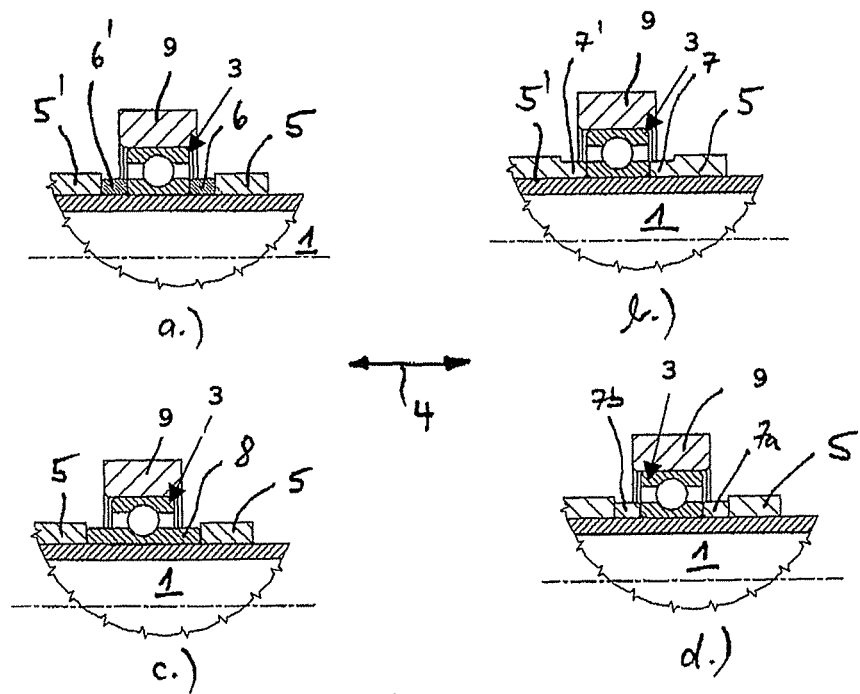
FIG. 2a to d show different embodiments of thrust bearings, which are embodied as ball bearings.
Figure 3:
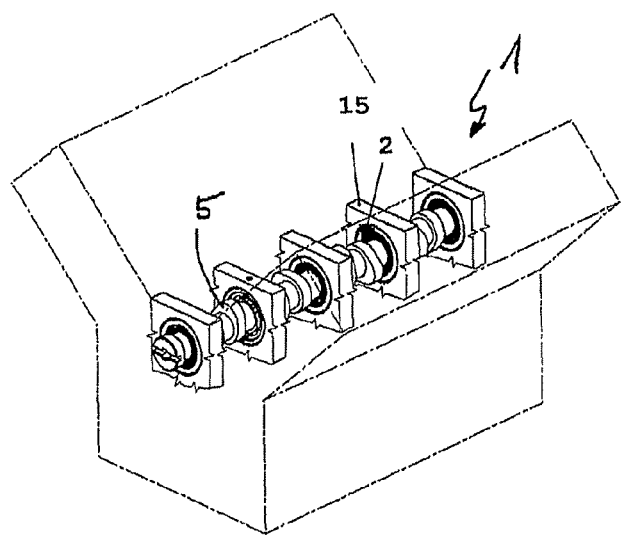
FIG. 3 shows a possible embodiment of thrust bearings of a cam shaft when assembled.

According to FIG. 2a to 2d, different embodiments of the thrust bearings 3, which are embodied as ball bearings, are illustrated thereby. FIG. 2a shows a thrust bearing 3 embodied as a ball bearing, which is arranged in axial direction 4 between two cams 5 and 5' and which is indirectly supported on the cams 5, 5' via two spacer bushings 6, 6'. The spacer bushings 6, 6' can thereby generally also be referred to as spacer elements.

Contrary thereto, FIG. 2b shows a thrust bearing 3, which is also arranged between two cams 5 and 5', which, however, is directly supported on the adjacent cams 5, 5', namely in each case via a collar 7, 7', which is a component of the cams 5, 5'. The collar 7, 7' in FIG. 2b thereby performs the task of the spacer bushings 6, 6' in FIG. 2a.

A part 8 (bushing) of the thrust bearing 3 on the cam shaft side in axial direction is embodied in FIG. 2c to be so wide that the thrust bearing 3 can also be directly supported on the adjacent cams 5 and 5'.

FIG. 2d shows an embodiment, where the thrust bearing 3, which is embodied as a ball bearing, is also located between two cams 5 and 5' of the cam shaft 1 and is supported on a collar 7a and 7b of the cams 5 and 5', wherein the respective collar 7a and 7b is not a component of the cam 5 and 5', but is soldered, welded or adhered thereto.

Figure 4:
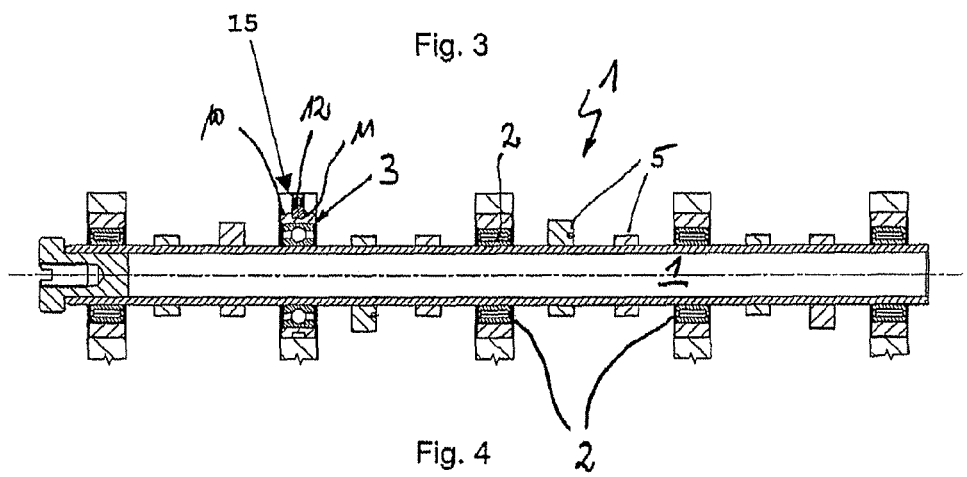
FIG. 4 shows a sectional view through a cam shaft comprising a thrust bearing according to the invention.

FIG. 4 illustrates a cam shaft 1 in a sectional view, wherein the roller bearings 2 as well as the at least one thrust bearing 3 can be identified well.

In the thrust bearing 3 according to FIG. 1 to 6, the thrust bearing 3 is embodied as a ball bearing and encompasses a bearing ring 9, at the outer jacket surface 10 of which provision is made for a revolving groove 11, which meshes with a connecting element 12, in particular a stud screw or a pin, at the side of the cylinder head and thus fixes the cam shaft 1 in axial direction 4.

Figure 5:
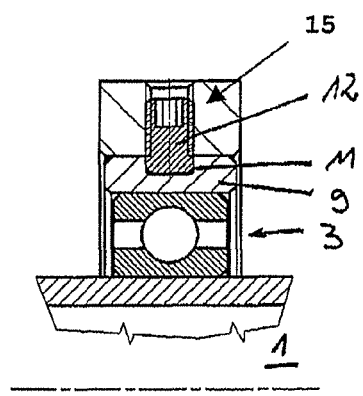
FIG. 5 shows a detailed view of a thrust bearing according to the invention.
Figure 6:
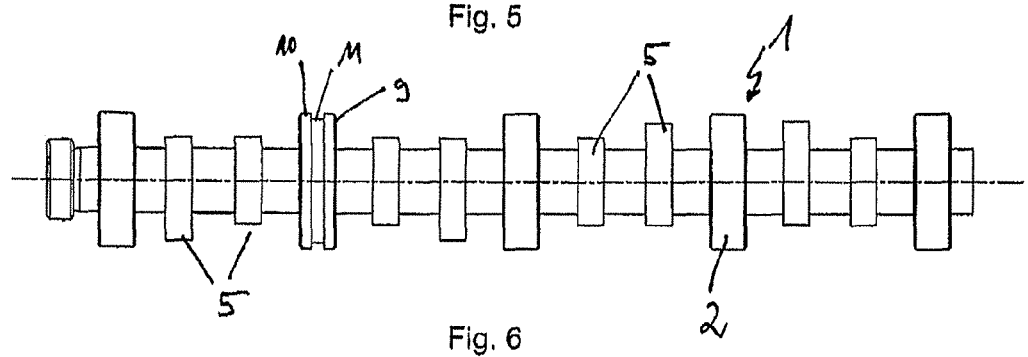
FIG. 6 shows a view onto a cam shaft according to the invention.

This can be identified particularly well in FIG. 5, wherein the connecting element 12 is embodied herein as a stud screw and meshes with the groove 11 of the bearing ring 9. A particularly clear illustration of the groove 11, which is arranged on the bearing ring 9, is shown in FIG. 6.

Figure 7:
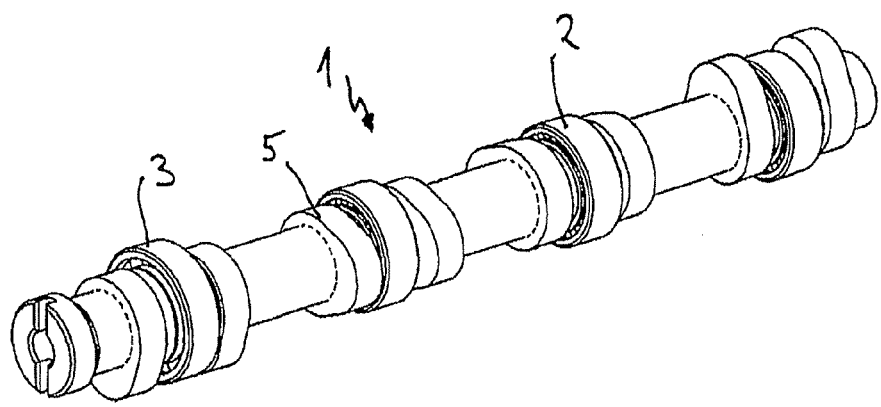
FIG. 7 shows a view onto a cam shaft according to the invention.
Figure 8:
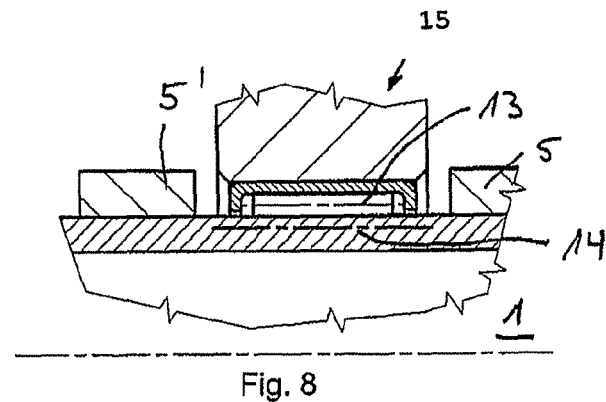
FIG. 8 shows a radial bearing embodied as a roller bearing.
Figure 9:
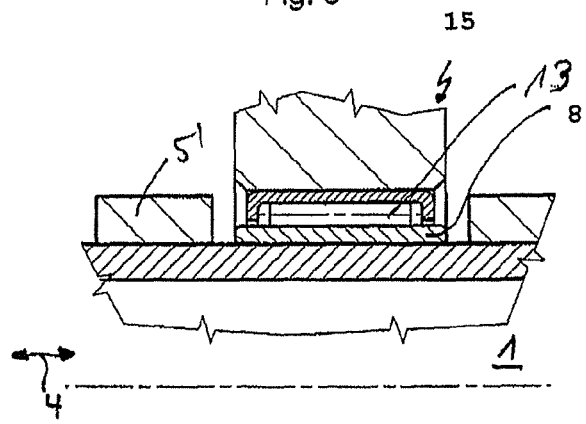
FIG. 9 shows an illustration as in FIG. 8, however in a different embodiment.
Figure 10:
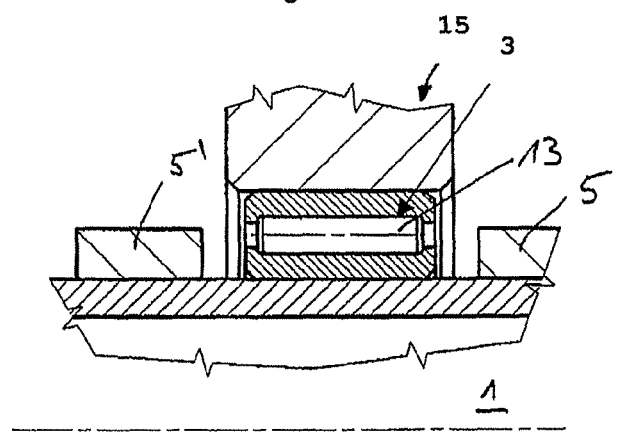
FIG. 10 shows a thrust bearing (held in position by means of frictional connection) embodied as a roller bearing.

Contrary thereto, the cam shaft 1 according to FIG. 7 does not encompass a thrust bearing 3, which is embodied as a ball bearing, but a thrust bearing according to FIG. 8 to 10, which is embodied as a roller bearing.

According to FIG. 8, the at least one radial bearing, which is embodied as a roller bearing, encompasses a roller 13, which runs directly on the cam shaft 1, wherein the region 14 of the cam shaft 1, which comes into contact with the roller 13, is hardened. Contrary thereto, provision is made with the thrust bearing 3 according to FIG. 9 in the region 14 of the thrust bearing 3, which is embodied as roller bearing, for a bushing 8, which is arranged directly on the cam shaft 1, on which the roller 13 of the roller bearing, that is to say the radial bearing, rolls. It goes without saying that the bushing 8 can also be made of a particularly wear-resistant material or can be subjected to an aging process, which increases the wear-resistance.

Figure 11:
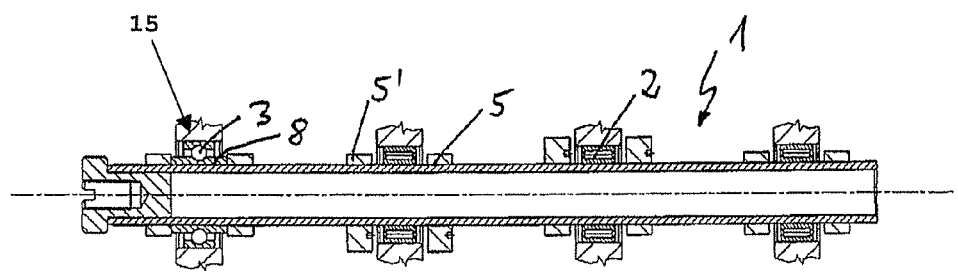
FIG. 11 to 13 show a sectional view through a cam shaft according to the invention in a respective other embodiment.
Figure 12:
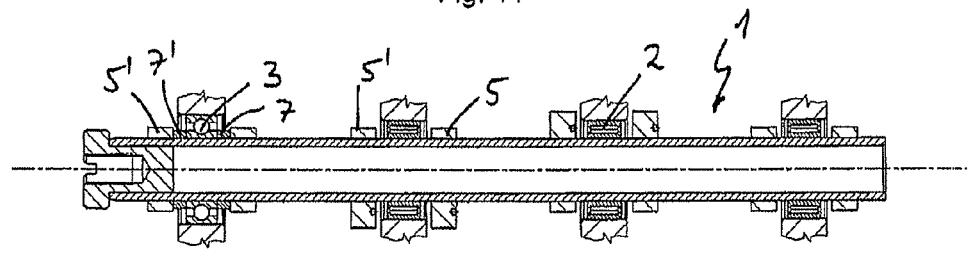
Figure 13:
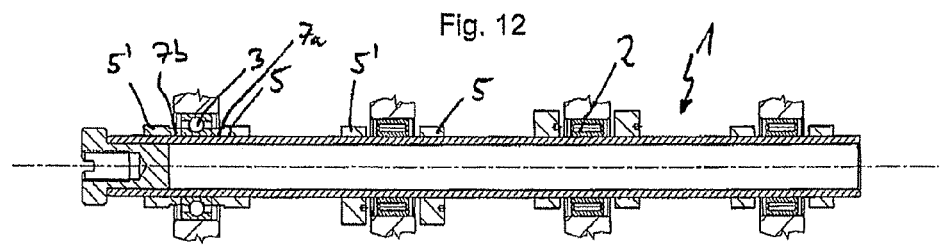

FIG. 11 to 13 once again show the thrust bearings 3 from FIG. 2b to 2d, which are embodied as ball bearings, in their post-assembly position.

The cam shafts 1 according to FIG. 7 to 11 are cam shafts 1 for engines comprising a so-called "open bearing". That is to say, the cam shaft 1 is held in position in the cam shaft bearing of the cylinder head 15 parallel to the cam shaft axis 4 and by means of bearing caps.

As a matter of principle, the cams 5 and/or the roller bearing 2 and/or the at least one thrust bearing 3 in the cam shaft 1 according to the invention are connected to the cam shaft 1 by means of a thermal joining process, by means of an interference fit assembly or by means of adhesion. It is thereby particularly advantageous that only finished cams 5 and/or roller bearings 2 and/or thrust bearings 3 are used for joining with the cam shaft 1 so that a finishing of the cam shaft 1 is no longer necessary after the application of the afore-mentioned components and that swarf and processing dust, respectively, can thus be prevented from reaching into the bearings and thus from damaging them in the long run.

The cam shaft 1 according to the invention makes it possible to replace a currently conventional washer disk, which is required for the thrust bearing of the cam shaft 1, with the thrust bearing 3 according to the invention, which, on the one hand, encompasses a considerably higher life expectancy and which, on the other, helps to reduce maintenance costs in particular.

In a particularly preferred method for producing the cam shaft 1, closed roller bearings 2 are applied to said cam shaft 1 during the cam shaft assembly.

Either individually as well combined with one another in any manner, all of the features described in the description and in the following claims can be substantial for the invention.

The invention claimed is:

1. A method for assembling a cam shaft, comprising:
   providing a cam shaft;
   pre-finishing at least one cam lobe;
   positioning the at least one pre-finished cam lobe directly on an outer surface of the cam shaft;
   positioning at least one roller bearing on an outer surface of the cam shaft, wherein the roller bearing supports the cam shaft in a first direction, and the at least one roller bearing is at least one of thermally adhered to and thermally interference fitted onto the cam shaft outer surface;
   positioning at least one thrust bearing on an outer surface of the cam shaft, wherein the thrust bearing supports the cam shaft in a second direction, the thrust bearing includes at least one of a ball bearing and a roller bearing, and wherein the thrust bearing is at least one of thermally adhered to and thermally interference fitted onto the cam shaft outer surface;
   wherein at least one of the at least one roller bearing, and the at least one thrust bearing are finished prior to joining the cam shaft;
   a bearing ring engaging the at least one thrust bearing, the bearing ring including an outer circumferential groove; and
   attaching a connecting element to a cylinder head of an internal combustion engine; and engaging the outer circumferential groove of the bearing ring with the connecting element.

2. A method for assembling a cam shaft, comprising:
   providing a cam shaft;
   pre-finishing at least one cam lobe;
   pre-finishing at least one roller bearing;

pre-finishing at least one thrust bearing;

positioning the at least one pre-finished cam lobe on an outer surface of the cam shaft and attaching the at least one pre-finished cam lobed to the cam shaft;

positioning the least one pre-finished roller bearing on an outer surface of the cam shaft, the at least one pre-finished roller bearing supporting the cam shaft in a first direction, and securing the at least one pre-finished roller bearing onto the cam shaft outer surface;

positioning at least one pre-finished thrust bearing on an outer surface of the cam shaft, the at least one pre-finished thrust bearing supporting the cam shaft in a second direction, and securing the at least one pre-finished thrust bearing onto the cam shaft outer surface;

a bearing ring engaging the at least one thrust bearing, the bearing ring including an outer circumferential groove; and attaching a connecting element to a cylinder head of an internal combustion engine; and engaging the outer circumferential groove of the bearing ring with the connecting element.

3. The method of claim 2, the at least one roller bearing being at least one thermally adhered to and thermally interference fit directly onto the cam shaft outer surface.

4. The method of claim 2, the thrust bearing including at least one of a ball bearing and a roller bearing.

5. The method of claim 2, the thrust bearing being at least one thermally adhered to and thermally interference fit directly onto the cam shaft outer surface.

6. The method of claim 2, the second direction extending generally parallel to a longitudinal axis of the cam shaft.

7. The method of claim 2, the connecting element being at least one of a stud screw and a pin.

8. The method of claim 2, the at least one roller bearing comprising at least one roller directly engaging the cam shaft.

9. The method of claim 8, further comprising hardening a region of the cam shaft that the roller directly engages.

10. The method of claim 2, further comprising a bushing directly engaging the cam shaft, wherein the at least one roller bearing comprises at least one roller directly engaging the bushing.

11. The method of claim 10, further comprising hardening the bushing.

12. The method of claim 10, further comprising joining the bushing to the cam shaft by at least one of adhesion, an interference fit, and welding.

13. The method of claim 3, further comprising attaching at least two cams to the cam shaft, and arranging the at least one thrust bearing for engaging the at least two cams.

14. The method of claim 2, further comprising:
attaching at least two cams to the cam shaft;
disposing at least two spacers between and engaging the at least two cams, and arranging the at least one thrust bearing for engaging the at least two spacers.

15. The method of claim 2, further comprising at least two cams, each cam including a collar, and arranging the at least one thrust bearing between the two cams for engaging the collar of the at least two cams.

16. The method of claim 15, further comprising forming the collar integrally with the cam.

17. The method of claim 15, further comprising attaching the collar to the cam by at least one of soldering, welding, and adhering.

18. The method of claim 2, further comprising configuring the camshaft to be supported in an internal combustion engine in at least one of a tunnel bearing manner and an open bearing manner.

19. The method of claim 2, the at least one roller bearing comprising a closed roller bearing and attaching the closed roller bearing to the cam shaft during assembly.

* * * * *

UNITED STATES PATENT AND TRADEMARK OFFICE
CERTIFICATE OF CORRECTION

| | | |
|---|---|---|
| PATENT NO. | : 8,720,055 B2 | Page 1 of 1 |
| APPLICATION NO. | : 13/494740 | |
| DATED | : May 13, 2014 | |
| INVENTOR(S) | : Flender et al. | |

It is certified that error appears in the above-identified patent and that said Letters Patent is hereby corrected as shown below:

In the Claims:

At column 6, claim number 13, line number 12, please change "claim 3" to "claim 2".

Signed and Sealed this
Twenty-third Day of December, 2014

Michelle K. Lee
*Deputy Director of the United States Patent and Trademark Office*